(12) United States Patent
Lovorn et al.

(10) Patent No.: US 10,400,572 B2
(45) Date of Patent: Sep. 3, 2019

(54) APPARATUS AND METHODS USING DRILLABILITY EXPONENTS

(71) Applicant: Halliburton Energy Services, Inc., Houston, TX (US)

(72) Inventors: James Randolph Lovorn, Tomball, TX (US); Jon Troy Gosney, Bellville, TX (US); Nancy Davis, Glen Rose, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 455 days.

(21) Appl. No.: 15/102,463

(22) PCT Filed: Dec. 30, 2013

(86) PCT No.: PCT/US2013/078339
§ 371 (c)(1),
(2) Date: Jun. 7, 2016

(87) PCT Pub. No.: WO2015/102581
PCT Pub. Date: Sep. 9, 2015

(65) Prior Publication Data
US 2017/0037721 A1 Feb. 9, 2017

(51) Int. Cl.
*E21B 12/02* (2006.01)
*E21B 21/08* (2006.01)
(Continued)

(52) U.S. Cl.
CPC .............. *E21B 44/005* (2013.01); *E21B 7/04* (2013.01); *E21B 12/02* (2013.01); *E21B 21/08* (2013.01);
(Continued)

(58) Field of Classification Search
CPC .......... E21B 12/02; E21B 21/08; E21B 44/00; E21B 44/005; E21B 45/00; E21B 47/02; E21B 47/06; E21B 47/12; E21B 49/00; E21B 7/04; G05B 19/048; G05B 19/402; G05B 2219/24015; G05B 2219/45129
See application file for complete search history.

(56) References Cited

U.S. PATENT DOCUMENTS 4,794,535 A 12/1988 Gray et al.
8,527,249 B2 * 9/2013 Jamison .................. E21B 44/02
703/10
(Continued)

FOREIGN PATENT DOCUMENTS

WO WO-2015102581 A1 7/2015

OTHER PUBLICATIONS

"International Application Serial No. PCT/US2013/078339, International Search Report dated Sep. 30, 2014", 3 pgs.
(Continued)

*Primary Examiner* — Daniel P Stephenson
(74) *Attorney, Agent, or Firm* — Gilliam IP PLLC

(57) ABSTRACT

Various embodiments include apparatus and methods to generate and use drillability exponents. Data acquired from downhole sensors can be used to determine drillability exponents. The drill exponents can be used in number of processes to enhance various features of a drilling operation. 5 Additional apparatus, systems, and methods are disclosed.

26 Claims, 3 Drawing Sheets

(51) Int. Cl.

| | |
|---|---|
| *E21B 44/00* | (2006.01) |
| *E21B 47/06* | (2012.01) |
| *E21B 7/04* | (2006.01) |
| *G05B 19/04* | (2006.01) |
| *G05B 19/048* | (2006.01) |
| *G05B 19/402* | (2006.01) |
| *E21B 47/02* | (2006.01) |
| *E21B 47/12* | (2012.01) |
| *E21B 45/00* | (2006.01) |
| *E21B 49/00* | (2006.01) |

(52) U.S. Cl.
CPC ............. *E21B 44/00* (2013.01); *E21B 47/02* (2013.01); *E21B 47/06* (2013.01); *E21B 47/12* (2013.01); *G05B 19/041* (2013.01); *G05B 19/048* (2013.01); *G05B 19/402* (2013.01); *E21B 45/00* (2013.01); *E21B 49/00* (2013.01); *G05B 2219/24015* (2013.01); *G05B 2219/45129* (2013.01)

(56) References Cited

U.S. PATENT DOCUMENTS

| | | |
|---|---|---|
| 9,328,573 B2 * | 5/2016 | Standifird ............... E21B 21/08 |
| 2002/0120401 A1 | 8/2002 | MacDonald et al. |
| 2004/0245017 A1 | 12/2004 | Chen et al. |
| 2007/0227774 A1 | 10/2007 | Reitsma et al. |
| 2008/0164062 A1 | 7/2008 | Brackin et al. |
| 2011/0108325 A1 | 5/2011 | Hartmann et al. |
| 2011/0174541 A1 | 7/2011 | Strachan et al. |
| 2012/0199397 A1 | 8/2012 | Wessling et al. |
| 2017/0037721 A1 * | 2/2017 | Lovorn ................ G05B 19/402 |

OTHER PUBLICATIONS

"International Application Serial No. PCT/US2013/078339, Written Opinion dated Sep. 30, 2014", 10 pgs.

Anistoroae, Anca Maria, "Datalog: Abnormal Formation Pressure Analysis", Version 2.1—Scribd, [Online]. Retrieved from the Internet: <URL: http://www.scribd.com/doc/57664091/54/Drilling-Exponent, (Feb. 2001), 113 pgs.

Eren, T., et al., "Real Time Optimization of Drilling Parameters During Drilling Operations", SPE Oil and Gas India Conference and Exhibition, Jan. 20-22, 2010, Mumbai, India, (2010), 14 pgs.

Falconer, I. G, et al., "Separating Bit and Lithology Effects from Drilling Mechanics Data", SPE/IADC Drilling Conference, Feb. 28-Mar. 2, 1988, Dallas, Texas, (1988), 123-136.

Greenwood, Jeremy A, "Integration of Pore Pressure/Fracture Gradient Prediction Methods and Real-Time Annulus Pressure Measurements Optimizes Drilling in Deltaic Environments", Asia Pacific Oil and Gas Conference and Exhibition, Oct. 30-Nov. 1, 2007, Jakarta, Indonesia, (2007), 13 pgs.

Hawker, Dave, Datalog: Abnormal Formation Pressure Analysis, Version 2.1, (Feb. 2001), 113 pgs.

Jorden, J. R, et al., "Application of Drilling Performance Data to Overpressure Detection", Journal of Petroleum Technology, 18(11), (Nov. 1966), 1387-1394.

Rehm, Bill, et al., "Measurement of Formation Pressure from Drilling Data", Fall Meeting of the Society of Petroleum Engineers of AIME, Oct. 3-6, 1971, New Orleans, Louisiana, (1971), 11 pgs.

* cited by examiner

APPARATUS AND METHODS USING DRILLABILITY EXPONENTS

PRIORITY APPLICATION

This application is a U.S. National Stage Filing under 35 U.S.C. 371 from International Application No. PCT/US2013/078339, filed on 30 Dec. 2013, and published as WO 2015/102581 A1 on 9 Jul. 2015, which applications and publication are incorporated herein by reference in their entirety.

TECHNICAL FIELD

The present invention relates generally to apparatus and methods associated with measurements related to oil and gas exploration.

BACKGROUND

In drilling wells for oil and gas exploration, understanding the structure and properties of the associated geological formation provides information to aid such exploration. In addition, information regarding operation of a drill bit is used to control the drilling operation. Measurements in a wellbore, also referred to as a borehole, are typically performed to attain this understanding. However, the environment in which the drilling tools operate is at significant distances below the surface and measurements to manage operation of such equipment are subject to errors depending on the measurement conditions. Further, the usefulness of such measurements may be related to the precision or quality of the information derived from such measurements.

DETAILED DESCRIPTION

Figure 1:
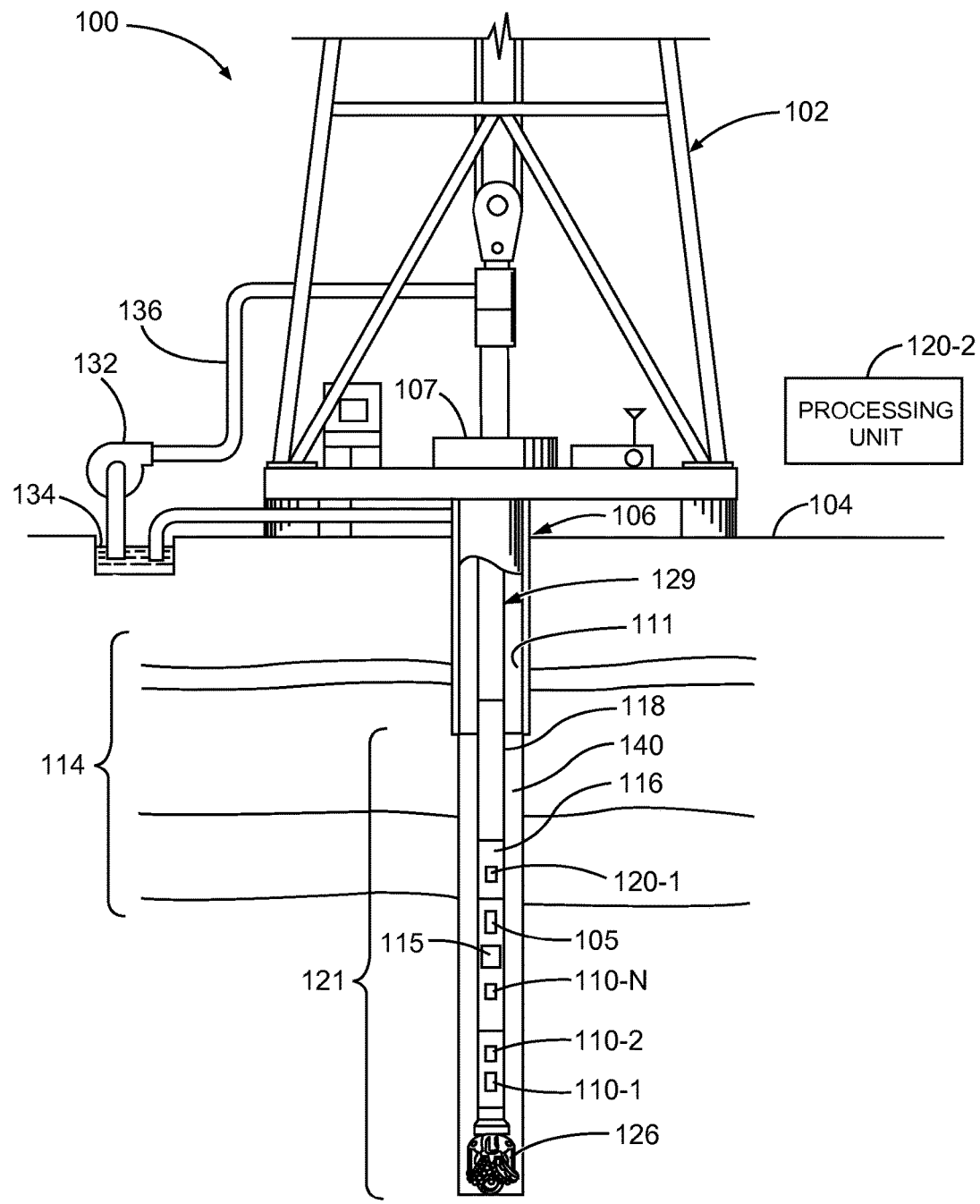
FIG. 1 is a schematic diagram of an example system for measuring drilling equipment downhole and generating a drillability exponent for the drill bit at a drilling site.

The following detailed description is directed to various example embodiments. The accompanying drawings show, by way of illustration and not limitation, some of the various example embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, data acquired from sensors operating downhole in a borehole can be used to populate a formula for a drillability factor to determine pore pressure prediction while drilling. A processing unit and sensors can be incorporated into standalone alone measurements-while-drilling (MWD) systems, such as logging-while-drilling (LWD) systems, or complex MWD systems with managed pressure drilling (MPD) operations. The generated drillability factor can be used as an indicator for drill-off occurring, an indicator of a change in pressure profiles, an indicator that the drill bit is failing, or as an indicator other drilling-related events or combinations of drilling-related events. The drillability factor determination and associated data can be used as input into a system to manage pressure within the drilling operation. This information also can be used for direct pore pressure measurements, for pore pressure prediction, and for compaction trends. The pore pressure updated from application of this information can improve the set point control of the drilling operation.

In drilling operations, as a drill bit makes an opening in rock, the drill bit generally operates on denser formations as the drilling operation proceeds to greater depths. The denser formations lead to slower rates of penetration (ROPs) by the drill bit. The drillability of a formation refers to the ease at which a particular formation can be drilled. One indicator of drillability is the so-called drillability exponent, which combines a number of the factors related to the ROP. The drillability exponent may provide a dimensionless number correlated to the drillability of a particular formation. A basic drillability exponent, d-exponent, is given by:

$$d\text{-exponent} = \log_{10}(R/60N)/\log_{10}(12W/10^6 D), \quad (1)$$

where: R=ROP (ft/hr) of the drill bit, N=RPM (rev/min) of the drill bit, W is the weight on bit (WOB) (lbs) on the drill bit, and D=drill bit size (ins). To take into consideration changes in mud weight, a corrected d-exponent, $d_c$-exponent, is given by:

$$d_c\text{-exponent} = (NP/MW)*d\text{-exponent}, \quad (2)$$

where NP=normal pressure gradient and MW=mud weight. The mud weight can be given by an equivalent circulating density (ECD). ECD is the hydrodynamic pressure experienced at the cutting face of the drill bit due to the combination of mud density, fluid viscosity, borehole wall friction, and cuttings load that act to increase the pressure. ECD can be estimated by calculations, but can be determined using a direct-measuring annulus probe in an MWD arrangement. These equations have been used in the past for pore pressure prediction and an indicator of bit life. However, these equations are not widely used with respect to pore pressure, because LWD systems can provide log responses to populate real time pore pressure modeling.

Drillability exponents as determined using identical or similar methods as taught herein can be corrected for applications according to standard procedures for such correction. These corrections can be made using data from downhole sensors. In drilling operations, matrix strength of a formation is a factor in drillability of the formation. Formation matrix strength of the formation depends, among other factors, upon the porosity, permeability, hardness, plasticity, and cementation of the lithology. Lithology refers to the macroscopic characteristics or qualities of mineral content, grain size, texture, and color of rocks. A matrix refers to fine-grained portion of a rock embedded with respect to larger particles such as coarser crystals or rock fragments. The $d_c$-exponent can be used to provide a corrected d-exponent for changes in the mud density so that it represents the differential between formation pressure and regional hydrostatic pressure. The $d_c$-exponent provides an indicator of undercompaction in impermeable but porous formation undergoing increasing compaction with depth. Variations from a $d_c$-exponent trend can be correlated to factors that affect the $d_c$-exponent trend. Such factors include, but are not limited to, bit dulling, new bit type, formation change, major changes in drilling parameters, bit hydraulics, new bit size, and overpressure (increase in mud weight).

To make pore pressure estimation from $d_c$-exponent, three distinct phases can be examined. These three phases are shifting of the $d_c$-exponent, fitting of normal compaction trend, and the production and fitting of overlays. Shifting $d_c$-exponent can be single stage (hole size) or multi-interval (bit run). A trend shift is typically conducted only after interpretation of other data. A normal compaction trend can be shifted to compensate for unconformities, hole size, hydraulics, hole angle, and bit type, which may appear faulted. To address these different compensations, the normal compaction trend can be applied in intervals. The normal compaction trend line can be taken to represent the normal pore pressure value. Use of normal compaction trend may include using a gamma ray minimum filter that effectively selects a shale point. A least squares fit method can be used to apply the normal compaction trend using $d_c$-exponent values for depths within the interval that correspond with gamma ray values above the shale point.

Overlays can be calculated on true vertical depth (TVD), where TVD typically remains relatively static, dependent on the position of the normal compaction trend. Two methods of overlay calculation are provided by the ratio method and the Eaton method, where the Eaton method may be considered to be the more accurate of the two methods. In the ratio method, the observed $d_c$-exponent, Dco, is given by $$Dco = c(P_{hyd}/P)d_c\text{-exponent}, \quad (3)$$

where $P_{hyd}$ is normal pore pressure, P is an estimate pore pressure, and c is an overlay coefficient, typically set to 1.0. In the Eaton method, Dco is given by $$Dco = ([S-P]/[S-P_{hyd}])^{1/b} d_c\text{-exponent}, \quad (4)$$

where S is the overburden gradient and b is a regional coefficient whose default value is normally taken to be 1.2.

In various embodiments, sensors operating downhole can provide values of the parameters to determine d-exponent and $d_c$-exponent such that d-exponent and $d_c$-exponent can be calculated with improved data set from the downhole sensors. In particular, ROP can be calculated based on downhole measurements using the z axis of an accelerometer to determine axial velocity along with determination of the WOB from downhole sensors. The RPM values can be provided from X and Y accelerometers. Pressure-while-drilling (PWD) tools to provide ECD can be used for MW. NP may be provided as a downloadable variable. With instrumented bits/hole size, the hole size can be updated real-time with caliper tools, formation testers, and/or any smart tool that can gauge a hole. The hole size may be a downloadable option to the tool string. In addition to the use of downhole sensors, a processing unit can be disposed downhole to calculate drillability exponents. Alternatively, drillability exponents and associated components can be calculated at the surface using data acquired from downhole sensors. For example, if the ROP cannot be calculated downhole, the raw parameters can be sent to the surface, calculated, and then sent downhole to the downhole system via a downlink. While the drillability exponent can be calculated downhole, the value of the downhole drillability exponent can be sent to the surface to be compared with a drillability exponent calculated with surface data, as is conventionally calculated at the surface. This comparison may be used as a sanity check to insure that the quality of the downhole calculation is within an acceptable surface calculated range.

The drillability exponents can be determined over depth and time providing drillability trends. Once the drillability exponent trend is calculated, it can be used to adjust stabilizers, a downhole choke, and inflator packers as flow restrictors to manage pressure for pressure events, based an analysis of the trend. The drillability exponent trend can be used to determine bit wear/bit performance. In addition, gamma tools can be used to filter trends for changes in lithology, which may cause the drillability curve to have abrupt changes.

Application of the downhole data improves the accuracy of the calculated drillability exponents. The downhole data also allows downhole computation and real time action based upon the data. Such processing can provide enhancements in land operations with narrow drilling windows. In addition, there is significant value in deep water operations for early event detection using the drillability exponent trend based on downhole sensor measurements.

The use of downhole measurement tools, instead of surface measurements, can provide a true weight on bit calculation versus surface weight measurements. In a vertical section of the well, the WOB/tension from a surface measurement does not account for buoyancy effects, whereas the downhole measurement provides a true weight on bit measurement as it includes the buoyancy effects of the drilling fluids. In a horizontal section, the WOB/tension is reduced by weight support from the bore hole, which may not be accurately taken into account in surface measurements. With a PWD sensor disposed downhole, the true ECD can be calculated because of the improved weight on bit calculation in conjunction with the d-exponent calculation.

Downhole sensors can include an RPM measurement, which can assist in determining the RPM down hole as the rotation may came from surface rotation or from a mud motor, while sliding. When a sensor is used on a mud motor downhole, the RPM of the mud motor can be determined and thus the RPM of the drill bit becomes known. Downhole processing instrumentality, including instructions stored in devices, can be used to determine in which state the tool is operating, such as sliding, rotating etc, to insure the proper RPM is accounted for if a mud motor is used or if a rotary steerable is being used downhole.

Compressive operational charts can be updated based on the improved data set from the use of downhole measurement tools. It is noted that porosity decreases with depth such that drilling becomes more difficult, resulting in an increase in the value of the d-exponent. This issue can be addressed with the use of downhole tools via the improved data from at drill bit measurements. With the improved measurement, the bottom hole pressure can be properly maintained via managed pressure drilling techniques at the surface. Such techniques can include, but are not limited to, changing ECD, changing mud weight, and adjusting bottom hole pressure via chokes. With knowledge that, with depth, drilling becomes more difficult, resulting in an increase in the exponent, the use of downhole tools can lead to improved compaction trends and/or calibration of compaction trends.

It is noted that a corrected drilling exponent is a technique widely used to identify overpressure. Utilizing the improved calculation from the use of downhole tools can assist in managing the bottom hole pressure due to the improved measurement. For example, the improvement can assist in avoiding placing unnecessary pressure on the formation leading to formation damage due to an improper d-exponent calculation with the conventional method.

With the addition of a gamma tool, the lithology determination also could be improved utilizing the improved calculation from the use of downhole tools, thus improving managed pressure drilling techniques. With the improved data set from the use of downhole tools, drillability exponent calculated from downhole data can serve as a substitute for data from a sonic tool, as an estimate, to assist in compaction trend analysis.

It is noted that the drillability exponent is a good indicator of porosity and differential pressure, which measurements are improved from the use of downhole tools. This improvement leads to improved managed pressure drilling and normal drilling practices. When other sensors are disposed downhole, other calculation techniques also can be improved.

It is noted that the drillability exponent calculation can be made down hole or made at the surface using the downhole sensor data that can be transmitted to the surface. The drillability exponent determined from data from downhole sensors can be used with a predefined compaction trend that can be loaded into the processing tools, which can look for deviations in trends by comparing the results from generating the drillability exponent to the predefined compaction trend. Upon determination of deviations, the proceeding tool can generate an alert to a driller, a monitoring system, a control system at the surface and/or a control unit downhole, or combinations of recipients for the alert. The drillability exponent calculated using data from the downhole sensor and/or this data from the downhole sensors can be transmitted to the surface to improve the pore pressure profiles in MPD operations. The relevant data can be transmitted to the surface as pulsed data to surface. If the pressures are increasing, the changing compaction trends would indicate possible pore pressure changes, which can provide early kick detection. In addition, the compaction trends can be calibrated by using the downhole PWD factors to the hydraulic models, which can lead to a change in the setpoint in the chokes.

In various embodiments, the processing of the drillability exponent can be augmented with prediction processing that provides data representing downhole data, if the occurrence of an event prevents use of downhole measurement values of one or more parameters. The prediction processing can provide virtual downhole measurement values as needed. During data acquisition and processing of the drillability exponent trend from depth and time measurements, an event may occur in which downhole data cannot be provided for processing. The virtual data from the prediction processing can provide this data.

A prediction processing unit can include one or more neural network models for predicting various well parameters. Inputs to the prediction processing unit can include output from downhole sensors, as well as output from other drilling-related sensors at a well site and parameters from various databases. Any well parameter, and any combination of well parameters, may be predicted by the prediction processing unit. If multiple neural networks are used, it is not necessary for all of the neural networks to share the same inputs. The prediction processing unit may be realized by techniques other than using neural network models. Other types of techniques, which may be used, include, but are not limited to, an artificial intelligence device, an adaptive model, a nonlinear function which generalizes for real systems, a genetic algorithm, a linear system model, and/or a nonlinear system model, or combinations of these.

The prediction processing unit can supply virtual outputs of downhole sensors to the processing unit for the drillability exponent, even if such downhole sensors become unavailable during a drilling operation. The prediction processing unit continues to output the predicted parameter values when the predictive device fails to receive valid actual parameter values, based on its training. The prediction processing unit can be trained using present and past actual values for the parameters and sensor data. Such values can be provided to the prediction processing unit during drilling, while setting up drilling components, during other stages of an overall drilling operation, and/or from data obtained while drilling at a prior wellbore. Data indicative of past errors in predictions produced by the prediction processing unit can be used. Terms or weights used in the prediction processing unit may be adjusted based on derivatives of output of the predictive device with respect to the terms. Input to the prediction processing unit may also include data generated by a computer simulation of the well drilling system.

During training, weights are assigned to the various input parameters and those weights are automatically adjusted such that the differences between the actual and predicted parameter values are minimized. If the underlying structure of the neural network model and the input parameters are properly chosen, training should result in very little difference between the actual parameter values and the predicted parameter values after a suitable training time.

Once trained, the prediction processing unit can accurately predict or estimate what value one or more parameters should have in the present and/or future. The prediction processing unit may perform a regression analysis, perform regression on a nonlinear function, and may utilize granular computing. An output of a first principle model may be input to the prediction processing unit and/or a first principle model may be included in the predictive device. A first principle model is a model established with limited or no assumptions related to empirical or fitted parameters.

With the prediction processing unit trained in real time, it is capable of predicting current values of one or more sensor measurements based on the outputs of other sensors. Thus, if a sensor output becomes unavailable, the prediction processing unit can supply the missing sensor measurement values, at least temporarily, until the sensor output again becomes available. In addition, although the prediction processing unit may stop training one or more neural network models when a sensor fails, it can continue to generate predictions for output of the faulty sensor or sensors based on other, still functioning sensor inputs to the predictive device, based on its training.

FIG. 1 is a schematic diagram of an example system 100 for measuring drilling equipment downhole and generating a drillability exponent for the drill bit at a drilling site. The system 100 includes a number of sensors 110-1, 110-2 . . . 110-N to make measurements on the drilling equipment, which can include, but is not limited to, one or more sensors to provide measurements for weight on bit, torque, bending moment, bending moment direction at the tool, vibrations, pressure, or temperature. The sensors 110-1, 110-2 . . . 110-N can include a PWD tool. The system 100 can include a control unit 105 that can control operation of the sensors 110-1, 110-2 . . . 110-N. In addition, control unit 105 may be structured to control various portions of the drilling operation.

The system 100 can include a processing unit 120-1 to process data from the sensors 110-1, 110-2 . . . 110-N to generate a drillability exponent. Processing unit 120-1 in conjunction with control unit 105 can perform operations based on the generated drillability exponent in a manner similar to or identical to techniques discussed herein. Processing unit 120-1 may be integrated with control unit 105 to provide processing and operational control. Alternatively, data acquired downhole by the sensors 110-1, 110-2 . . . 110-N can be sent to a processing unit 120-2 at the surface 104 to generate a drillability exponent and to conduct activities in response to analysis using the drillability exponent. The activities can include regulating components 115 on a string of drill pipes, that is, drill string 129. Regulating the components 115 can include adjusting stabilizers, a downhole choke, and inflator packers, among other components. Use of chokes for pressure and flow control in drilling operations is discussed in U.S. Pat. No. 8,281,875. Though represented at one location on the drill string 129, the components 115 can be distributed along the drill string 129.

The system 100 can include a drilling rig 102, located at the surface 104 of a well 106, and the drill string 129 connected together so as to form a drilling string that is lowered through a rotary table 107 into a wellbore or borehole 111. The drilling rig 102 can provide support for the drill string 129. The drill string 129 can operate to penetrate rotary table 107 for drilling the borehole 111 through subsurface formations 114. The drill string 129 can include a drill pipe 118 and a bottom hole assembly 121 located at the lower portion of the drill pipe 118.

The bottom hole assembly 121 can include a drill collar 116 and a drill bit 126. The drill bit 126 can operate to create the borehole 111 by penetrating the surface 104 and the subsurface formations 114. The bottom hole assembly 121 may also include the processing unit 120-1 in conjunction with the control unit 105 arranged to perform operations to conduct measurements to determine formation parameters. The various components associated with making measurements can be structured for an implementation as a MWD system such as a LWD system. The housing containing these components can include electronics to initiate measurements from selected transmitter antennas and to collect measurement signals from selected receiver antennas to conduct measurements to determine formation parameters. Such electronics can include a processing unit to provide analysis of formation parameters and the processing unit 120-1 to generate a drillability exponent and associated data. The analysis and the drillability exponent and associated data can be provided to the surface 104 by the electronics over a standard communication mechanism for operating in a well. Alternatively, electronics can include a communications interface to provide measurement signals collected downhole to the surface 104 over a standard communication mechanism for operating in a well, where these measurements signals can be analyzed at a processing unit, such as processing unit 120-2, at the surface 104 to provide analysis of formation parameters and/or to generate a drillability exponent and associated data.

During drilling operations, the drill string 129 can be rotated by the rotary table 107. In addition to, or alternatively, the bottom hole assembly 121 can also be rotated by a motor (e.g., a mud motor) that is located downhole. The drill collars 116 can be used to add weight to the drill bit 126. The drill collars 116 also can stiffen the bottom hole assembly 121 to allow the bottom hole assembly 121 to transfer the added weight to the drill bit 126, and in turn, assist the drill bit 126 in penetrating the surface 104 and the subsurface formations 114.

During drilling operations, a mud pump 132 can pump drilling fluid (sometimes known by those of skill in the art as "drilling mud") from a mud pit 134 through a hose 136 into the drill pipe 118 and down to the drill bit 126. The drilling fluid can flow out from the drill bit 126 and be returned to the surface 104 through an annular area 140 between the drill pipe 118 and the sides of the borehole 111. The drilling fluid may then be returned to the mud pit 134, where such fluid is filtered. In some embodiments, the drilling fluid can be used to cool the drill bit 126, as well as to provide lubrication for the drill bit 126 during drilling operations. Additionally, the drilling fluid may be used to remove subsurface formation cuttings created by operating the drill bit 126.

Figure 2:
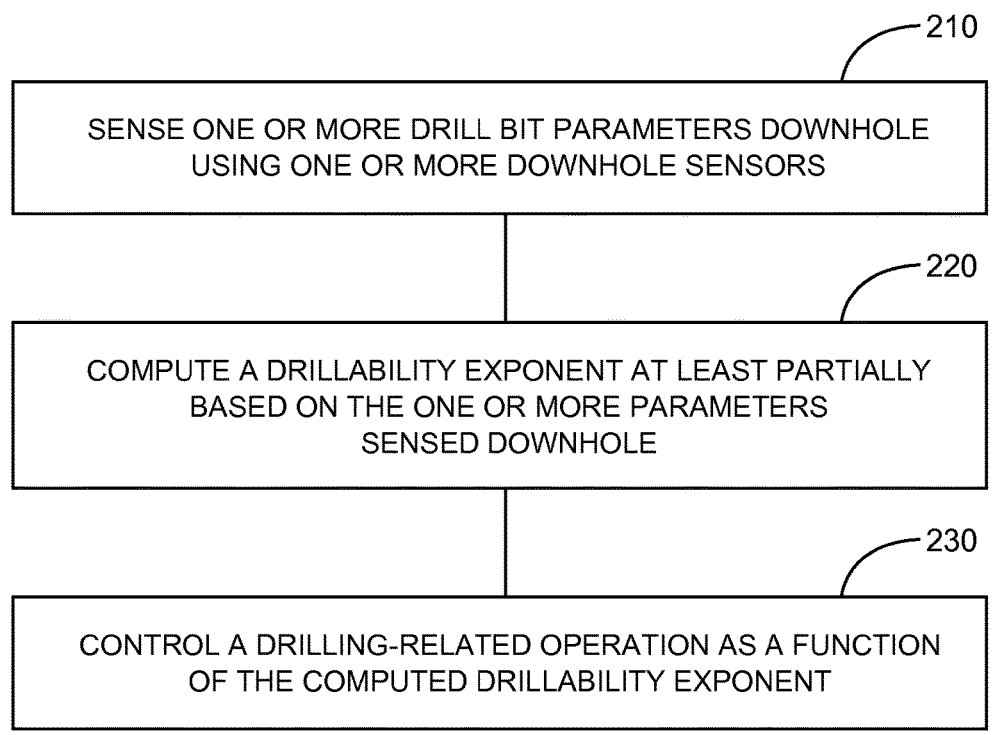
FIG. 2 is a flowchart of an example process of controlling a drilling-related operation.

FIG. 2 is a flowchart of an example process of controlling a drilling-related operation. At 210, one or more drill bit parameters downhole are sensed using one or more downhole sensors. The parameters can include weight on bit of the drill bit. The parameters can also include rate of penetration of the drill bit and the revolutions per minute of the drill bit. At 220, a drillability exponent, at least partially, is computed based on the one or more parameters sensed downhole. At 230, a drilling-related operation is controlled as a function of the computed drillability exponent. The acquisition of data from downhole sensors and calculation of the drillability exponent is realized under the control of a processor.

Controlling the drilling-related operation can include conducting managed pressure drilling. Controlling the drilling-related operation can include conducting directional drilling. Controlling the drilling-related operation can include determining pore pressure prediction during drilling. Controlling the drilling-related operation can include using the drillability exponent as an indicator for occurrence of drill-off, as an indicator of change in pressure profiles, or as an indicator of the drill bit failing. A decreasing drillability exponent is typically an indicator that the rock is becoming easier to penetrate. This could be a function of the pore increase increasing which would mean the confining stress of the fluid column is decreasing, which allows the bit to be more efficient. It could be a high porosity zone such as a sand or limestone. Use of a gamma tool could provide the delimiter of these formations. An increasing drillability exponent is an indicator of bit wear or drill bit failure. Controlling the drilling-related operation based on the drillability exponent can include conducting a drilling action in real time based on the drillability exponent. Conducting a drilling action can include adding pressure or decreasing pressure manually or automatically with a managed pressure drilling system to keep the well operating above a lower pore pressure boundary or within a window. Controlling the drilling-related operation can include maintaining a current operation based on analysis of the drillability exponent indicating that the current operation is within desired or acceptable bounds.

The process can include using the drillability exponent as an indicator of bit life of the drill bit. The process can include computing the drillability exponent at the surface of the borehole using the one or more drill bit parameters determined from the sensors disposed downhole. The process can include comparing the drillability exponent determined from the one or more drill bit parameters determined downhole to a determination of a drillability exponent using surface generated values of the one or more drill bit parameters. The process can include calculating a trend of the drillability exponent over depth and time. The trend can be used to adjust stabilizers, a downhole choke, inflator packers, or combinations thereof. The process can include using one or more gamma tools to filter trends for changes in lithology. A least square method can be applied to correct the trends.

The process can include using a modified drillability exponent. Using the modified drillability exponent can include using the drillability exponent modified by a ratio of normal pressure gradient to mud weight. The method can include using a PWD sensor to determine an ECD.

The process can include repeating the sensing of the one or more drill bit parameters downhole over time and replacing one or more values with values generated using a predictive analysis unit when one or more events interrupt the determining of the values of the parameters using the sensors downhole. Using a predictive analysis unit can include using a neutral network analysis.

In various embodiments, a non-transitory machine-readable storage device can comprise instructions stored thereon, which, when performed by a machine, cause the machine to perform operations, the operations comprising one or more features similar to or identical to features of methods and techniques described herein. The physical structures of such instructions may be operated on by one or more processors. Executing these physical structures can cause the machine to perform operations to: sense one or more drill bit parameters downhole, including weight-on-bit, using one or more downhole sensors; compute a drillability exponent at least partially based on the one or more parameters sensed downhole; and control a drilling-related operation as a function of the computed drillability exponent. The parameters can include rate of penetration of the drill bit in addition to weight on bit of the drill bit. The parameters can also include the revolutions per minute of the drill bit. The instructions can include instructions to operate a tool or tools having sensors disposed downhole in a borehole to provide data to a processing unit in accordance with the teachings herein.

The instructions include using real time data. The instructions can include using off-location mobile evaluation applications. The instructions can include pulling a first set of data from a drilling rig computer; evaluating the first set of data; and pushing a second of data back to the drilling rig computer. The second of data may be the first set of data after modification. The instructions can include setting an alarm based on the evaluated data.

Further, a machine-readable storage device, herein, is a physical device that stores data represented by physical structure within the device. Examples of machine-readable storage devices can include, but are not limited to, read only memory (ROM), random access memory (RAM), a magnetic disk storage device, an optical storage device, a flash memory, and other electronic, magnetic, and/or optical memory devices.

In various embodiments, a system can comprise a tool structure and a processing unit to process data from operating the tool structure. The tool structure can include sensors operable downhole in a borehole to provide data, related to operation of a drill bit, to the processing unit. The tool structure also can include sensors operable downhole in a borehole to provide data, related to formation properties, to the processing unit or to another processing unit. The processing unit can be structured: to determine values of parameters of a drill bit operating downhole in a borehole using sensors disposed downhole; to determine a drillability exponent for the drill bit using the values; and to direct a drilling-related operation based on the drillability exponent. The parameters can include weight on bit of the drill bit and rate of penetration of the drill bit. The parameters can also include the revolutions per minute of the drill bit. The processing unit can be structured to perform processing techniques similar to or identical to the techniques discussed herein. The processing unit can be configured to acquire signals from the downhole sensors, process the acquired signals, and process data related to or generated from the acquired signals. The processing unit may be arranged as an integrated unit or a distributed unit. The processing unit can be disposed at the surface of a wellbore to process the data from the downhole sensors. The processing unit be disposed in a housing unit integrated with the tool structure or arranged downhole in the vicinity of the tool structure. The processing unit may process in real time data from the downhole sensors in a manner similar to or identical to the techniques discussed herein.

Figure 3:
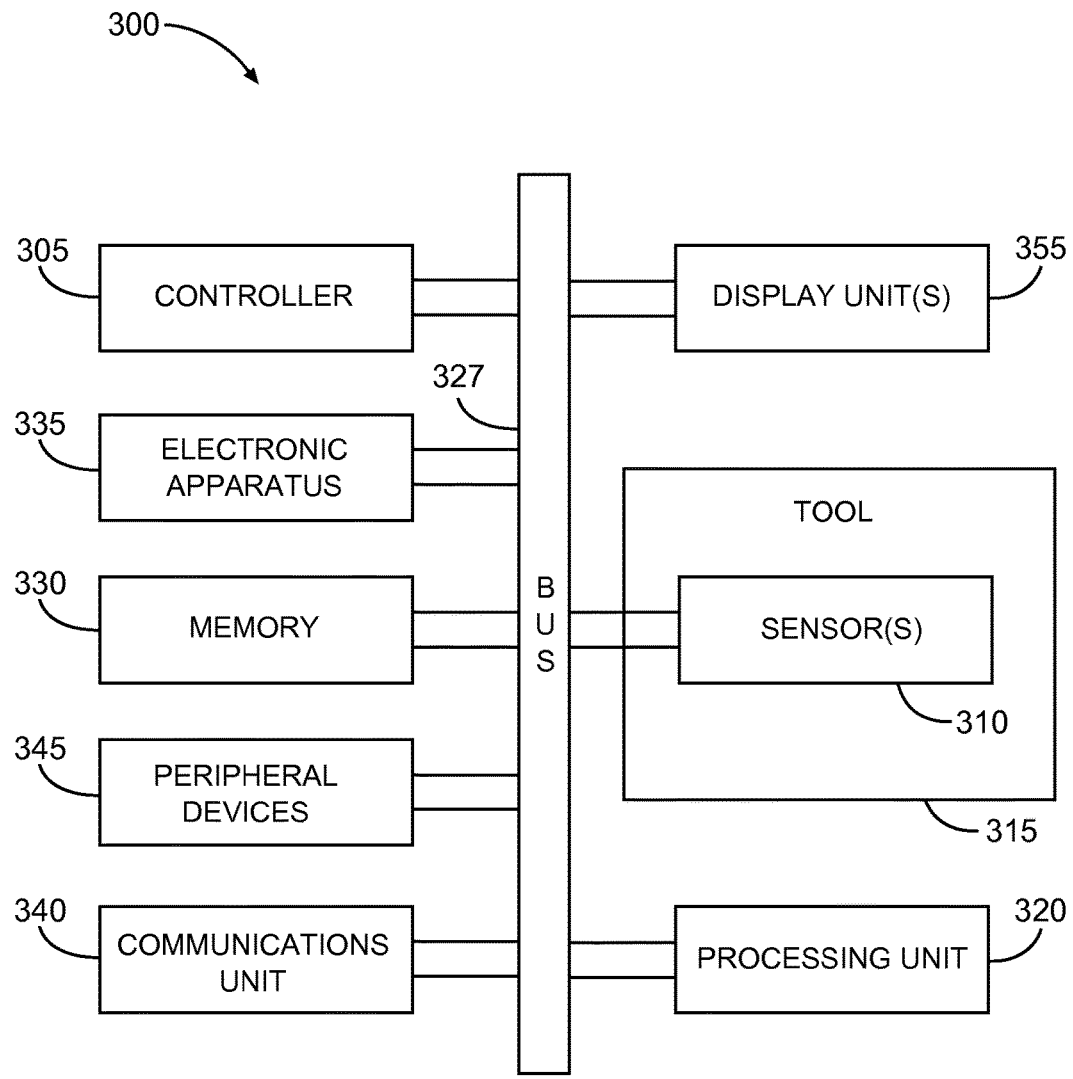
FIG. 3 is a block diagram of features of an example system operable to process data, from measurements made downhole in a wellbore, to generate a drillability exponent for a drill bit of a drilling operation.

FIG. 3 is a block diagram of features of an embodiment of an example system 300 operable to process data, from measurements made downhole in a wellbore, to generate a drillability exponent for a drill bit of a drilling operation. The system 300 can be configured to conduct a drilling-related activity based on analysis using the drillability exponent generated from downhole data. The system 300 includes a tool 315 having an arrangement of sensor(s) 310. Sensor(s) 310 can include one or more sensors to provide measurements for weight on bit, torque, bending moment, bending moment direction at the tool, vibrations, pressure, or temperature. Sensor(s) 310 may also include transmitter antenna(s), receiver antenna(s), or other devices to perform measurements to determine formation properties.

The system 300 can also include a controller 305, a memory 330, electronic apparatus 335, and a communications unit 340. The controller 305 and the memory 330 can be arranged to operate the tool 315 to acquire measurement data as the tool 315 is operated. The controller 305 can be realized as one or more processors. The memory 330 can be realized as a number of memory devices, either co-located or distributed. The controller 305 and the memory 330 can be realized to control activation of selected ones of the sensor(s) 310 and to manage processing schemes to determine a drillability exponent using downhole data acquired by sensor(s) 310 in accordance with measurement procedures and signal processing as described herein. Alternatively, a dedicated processing unit 320 can be structured to perform operations to manage processing schemes to determine a drillability exponent in accordance with measurement procedures and signal processing in a manner similar to or identical to embodiments described herein.

Electronic apparatus 335 can be used in conjunction with the controller 305 to perform tasks associated with taking measurements downhole with the sensor(s) 310 of the tool 315. The communications unit 340 can include downhole communications for a drilling operation. Such downhole communications can include a telemetry system.

The system 300 can also include a bus 327, where the bus 327 provides electrical conductivity among the components of the system 300. The bus 327 can include an address bus, a data bus, and a control bus, each independently configured. The bus 327 can also use common conductive lines for providing one or more of address, data, or control, the use of which can be regulated by the controller 305. The bus 327 can include instrumentality for network communication. The bus 327 can be configured such that the components of the system 300 are distributed. Such distribution can be arranged between downhole components such as the sensor(s) 310 of the tool 315 and components that can be disposed on the surface of a well. Alternatively, the components can be co-located such as on one or more collars of a drill string.

In various embodiments, peripheral devices 345 can include additional storage memory and/or other control devices that may operate in conjunction with the controller 305 and/or the memory 330. The peripheral devices 345 can be arranged to operate in conjunction with display unit(s) 355 with instructions stored in the memory 335 to implement a user interface to manage the operation of the one or more components distributed within the system 300. Such a user interface can be operated in conjunction with the communications unit 340 and the bus 327.

Various components of the system 300 can be integrated with the tool 315 such that processing identical to or similar to the processing schemes discussed with respect to various embodiments herein can be performed downhole in the vicinity of the measurement or at the surface. Alternatively, distribution of the components of the system 300 can allow processing of downhole data at the surface of a wellbore. Processing with respect to determining a drillability exponent and analysis of a drilling operation using the drillability exponent can be conducted in real time downhole or at the surface. Processing at the surface is delayed relative to processing downhole due to time associated with providing the downhole data to the surface.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method, comprising:
    sensing one or more drill bit parameters downhole, including weight-on-bit, using one or more downhole sensors;
    computing a drillability exponent at least partially based on a ratio of two logarithms including a first logarithm of a rate of penetration of a bit and revolutions per minute of the bit and a second logarithm of the weight-on-bit and size of the bit; and
    controlling a drilling-related operation as a function of the computed drillability exponent.

2. The method of claim 1, wherein controlling the drilling-related operation includes conducting managed pressure drilling.

3. The method of claim 1, wherein controlling the drilling-related operation includes conducting directional drilling.

4. The method of claim 1, wherein controlling the drilling-related operation includes determining pore pressure prediction during drilling.

5. The method of claim 1, wherein the method includes using the drillability exponent as an indicator of bit life of the drill bit.

6. The method of claim 1, wherein the method includes computing the drillability exponent at the surface of the borehole using the one or more drill bit parameters determined from the sensors disposed downhole.

7. The method of claim 1, wherein the method includes comparing the drillability exponent computed from the one or more drill bit parameters determined downhole to a determination of a drillability exponent using surface generated values of the one or more drill bit parameters.

8. The method of claim 1, wherein controlling the drilling-related operation includes using the drillability exponent as an indicator for drill-off occurring, as an indicator of change in pressure profiles, or as an indicator of the drill bit failing.

9. The method of claim 8, wherein an increasing drillability exponent is an indicator of bit wear or drill bit failure.

10. The method of claim 1, wherein the method includes calculating a trend of the drillability exponent over depth and time.

11. The method of claim 10, wherein the method includes using the trend to adjust stabilizers, a downhole choke, inflator packers, or combinations thereof.

12. The method of claim 1, wherein the method includes using one or more gamma tools to filter trends for changes in lithology.

13. The method of claim 12, wherein the method includes applying a least square method to correct the trends.

14. The method of claim 1, wherein controlling the drilling-related operation based on the drillability exponent includes conducting a drilling action in real time based on the drillability exponent.

15. The method of claim 14, wherein conducting a drilling action includes adding pressure or decreasing pressure manually or automatically with a managed pressure drilling system to keep the well operating above a lower pore pressure boundary or within a window.

16. The method of claim 1, wherein the method includes using a modified drillability exponent.

17. The method of claim 16, wherein using the modified drillability exponent includes using the drillability exponent modified by a ratio of normal pressure gradient to mud weight.

18. The method of claim 17, wherein the method includes using a pressure-while-drilling sensor to determine an equivalent circulating density.

19. The method of claim 1, wherein the method includes repeating the sensing one or more drill bit parameters over time and replacing one or more values of the one or more drill bit parameters with values generated using a predictive analysis unit when one or more events interrupt the sensing one or more drill bit parameters using the sensors downhole.

20. The method of claim 19, wherein using a predictive analysis unit includes using a neutral network analysis.

21. A machine-readable storage device having instructions stored thereon, which, when performed by a machine, cause the machine to perform operations, the operations comprising:
    sensing one or more drill bit parameters downhole, including weight-on-bit, using one or more downhole sensors;
    computing a drillability exponent at least partially based on a ratio of two logarithms including a first logarithm of a rate of penetration of a bit and revolutions per minute of the bit and a second logarithm of the weight-on-bit and size of the bit; and
    controlling a drilling-related operation as a function of the computed drillability exponent.

22. The machine-readable storage device of claim 21, wherein the instructions include instructions to cause a machine to use real time data.

23. The machine-readable storage device of claim 21, wherein the instructions include instructions to cause a machine to use off-location mobile evaluation applications.

24. The machine-readable storage device of claim 21, wherein the instructions include instructions to cause a machine to:
  pull a first set of data from a drilling rig computer;
  evaluate the first set of data; and
  push a second set of back to the drilling rig computer.

25. The machine-readable storage device of claim 24, wherein the instructions include instructions to cause the machine to set an alarm based on the evaluated data.

26. A system comprising:
  sensors operable downhole in a borehole to sense one or more drill bit parameters downhole; and
  a processing unit configured to operate to:
    compute a drillability exponent at least partially based on a ratio of two logarithms including a first logarithm of a rate of penetration of a bit and revolutions per minute of the bit and a second logarithm of the weight-on-bit and size of the bit: and
    control a drilling-related operation as a function of the computed drillability exponent.

* * * * *

UNITED STATES PATENT AND TRADEMARK OFFICE
CERTIFICATE OF CORRECTION

PATENT NO. : 10,400,572 B2
APPLICATION NO. : 15/102463
DATED : September 3, 2019
INVENTOR(S) : James Randolph Lovorn, Jon Troy Gosney and Nancy Davis Page 1 of 1

It is certified that error appears in the above-identified patent and that said Letters Patent is hereby corrected as shown below:

On the Title Page

Item (87) PCT Pub. Date portion reading "Sep. 9, 2015" should read --Jul 9, 2015--

In the Specification

Column 4, Line 1, the portion reading "check to insure that" should read --check to ensure that--

Signed and Sealed this
Ninth Day of June, 2020

Andrei Iancu
*Director of the United States Patent and Trademark Office*